United States Patent [19]

Maurer

[11] Patent Number: 5,184,107
[45] Date of Patent: Feb. 2, 1993

[54] PIEZORESISTIVE PRESSURE TRANSDUCER WITH A CONDUCTIVE ELASTOMERIC SEAL

[75] Inventor: Dean J. Maurer, Freeport, Ill.

[73] Assignee: Honeywell, Inc., Minneapolis, Minn.

[21] Appl. No.: 826,206

[22] Filed: Jan. 24, 1992

Related U.S. Application Data

[63] Continuation of Ser. No. 646,568, Jan. 28, 1991, abandoned.

[51] Int. Cl.$^5$ .............................................. H01C 10/10
[52] U.S. Cl. ........................................ 338/42; 73/721;
73/727; 29/621.1
[58] Field of Search ............................ 338/42, 36, 2, 4;
29/595, 613, 621.1; 73/862.38, 862.45, 862.47,
862.58, 862.62, 862.67, 715, 719, 721, 722, 724,
727

[56] References Cited

U.S. PATENT DOCUMENTS

| | | |
|---|---|---|
| 3,587,322 | 6/1971 | Lobdell . |
| 3,899,766 | 8/1975 | Mermelstein . |
| 3,995,493 | 12/1976 | Nishihara ........................ 73/722 X |
| 4,040,297 | 8/1977 | Karsmaker et al. . |
| 4,116,075 | 9/1978 | Ort . |
| 4,145,588 | 3/1979 | Orcutt . |
| 4,373,397 | 2/1983 | Keller . |
| 4,500,864 | 2/1985 | Nakane . |
| 4,503,705 | 3/1985 | Polchaninoff . |
| 4,505,157 | 3/1985 | Le . |
| 4,513,623 | 4/1985 | Kurtz . |
| 4,519,255 | 5/1985 | Ishii . |
| 4,609,966 | 9/1986 | Kuisma ........................ 73/724 X |
| 4,655,088 | 4/1987 | Adams . |
| 4,656,454 | 4/1987 | Rosenberger ..................... 338/2 |
| 4,691,575 | 9/1987 | Sondenegger et al. . |
| 4,770,045 | 9/1988 | Nakagawa . |
| 4,825,876 | 5/1989 | Beard . |
| 4,906,311 | 3/1990 | Gurol ........................... 156/89 |

OTHER PUBLICATIONS

Article by dated Aug. 1987, "Guidelines for Designing Elastomeric Connectors into the System".
Article by Arthur J. Little, "Low-Cost Solid-State Oil-Pressure Sensor".
Article by J. D. Mosley dated Dec. 7, 1989, "Elastomeric Connectors".
Article Titled Elastomeric Connectors Target Fine Line and High Density.
3 Advertising documents by Fujipoly titled: "Low Resistance Elastomeric Connectors", Connector W Series & Low Resistance Elastomeric Connectors.

*Primary Examiner*—Marvin M. Lateef
*Attorney, Agent, or Firm*—Charles R. Rubow

[57] ABSTRACT

A low cost piezoresistive pressure transducer utilizing premolded elastomeric seals in which at least one seal is electrically conductive. A piezoresistive stress sensitive element in the form of a diaphragm of semiconductor material having a thickened rim is held at its rim between a pair of premolded elastomeric seals in a two piece housing. Electrical connections with external circuitry are made by conductive paths through one of the elastomeric seals which makes contact with electrical leads which pass through the housing wall.

25 Claims, 4 Drawing Sheets

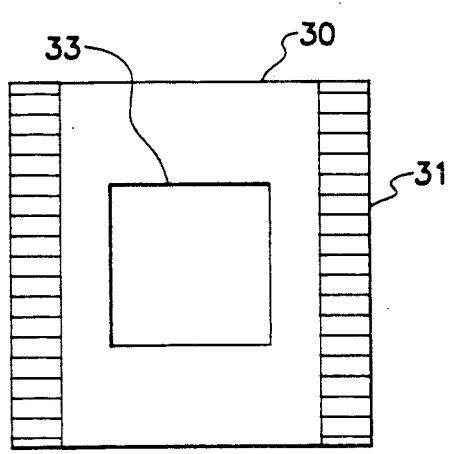
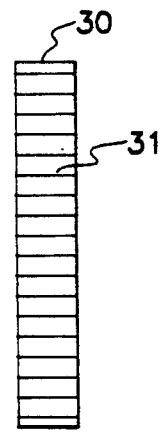
Fig. 3A          Fig. 3B
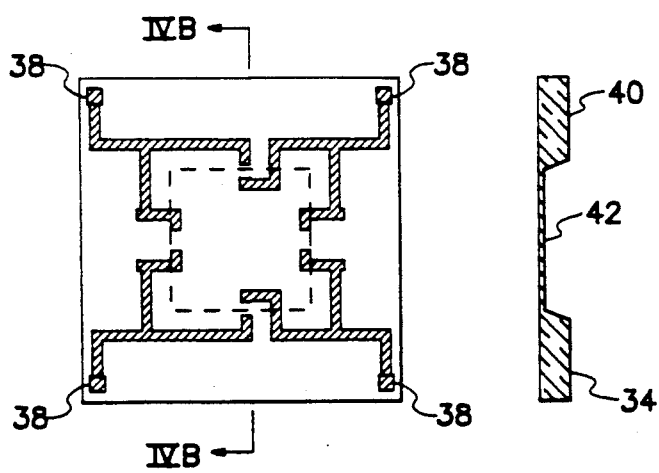
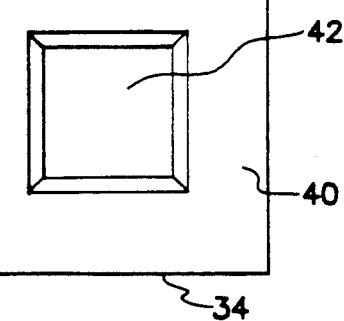
Fig. 4A     Fig. 4B     Fig. 4C

PIEZORESISTIVE PRESSURE TRANSDUCER WITH A CONDUCTIVE ELASTOMERIC SEAL

This application is a continuation of application Ser. No. 07/646,568, filed Jan. 28, 1991, abandoned.

BACKGROUND OF THE INVENTION

The invention disclosed herein relates generally to semiconductor pressure sensing apparatus, and more particularly to such apparatus employing a piezoresistive stress sensitive element mounted in a low cost housing employing premolded elastomeric seals, one of which is electrically conductive.

It is well known to package piezoresistive stress sensitive elements so that they are adapted to sense fluid pressure. In order to obtain an output indicative of fluid pressure, such a stress sensitive element must be interfaced with other structure in at least two respects which may have significant effects on the output of the element. Specifically, the element must be mechanically supported and a fluid tight joint must be provided between the element and the support structure to enable fluid pressures to produce a force differential between different portions (typically opposite sides) of the element.

An example of such a pressure transducer is seen in U.S. Pat. No. 4,656,454 issued to M. Rosenberger on Apr. 7, 1987. The transducer in U.S. Pat. No. 4,656,454 shows a three piece housing enclosing a stress sensitive diaphragm and two elastomeric seals. The diaphragm is compressed between the two elastomeric seals and ports on either end of the transducer to allow the pressure into the housing to be measured. Piezoresistors on the diaphragm are used in detecting pressure changes. Electrical connections are made to the diaphragm by bonding electrical jumpers onto the conductive regions of the diaphragm. These electrical jumpers are also welded to electrical means which carry current to the outside of the housing. After the electrical connections are made the three pieces of the housing are then ultrasonically welded together.

The applicant has devised a unique piezoresistive pressure transducer design utilizing a low cost housing and premolded elastomeric seals, which design simplifies the assembly process by eliminating the need to bond electrical connections or ultrasonically weld housing pieces together.

SUMMARY OF THE INVENTION

The present invention is a low cost piezoresistive pressure transducer utilizing premolded elastomeric seals. The transducer assembly basically comprises a semiconductor diaphragm having a piezoresistive device on a central portion thereof and conductive regions extending from the piezoresistive device to a peripheral portion of the diaphragm, the diaphragm being contained in a housing having at least one pressure port, and a pair of opposing internal surfaces on opposite sides of the diaphragm configured to form seats for seals. Premolded elastomeric seals are located between each seat and the adjacent side of the diaphragm. One elastomeric seal is electrically conductive and it selectively conducts current from the periphery of the diaphragm to electrical leads located at the seat of the seal. These electrical leads conduct the current to the exterior of the housing.

The housing may comprise two pieces which have opposing internal surfaces which act as the seats for the seals and which compress the seals and the diaphragm together upon assembly. The first piece of the housing is configured with an internal cavity which contains and aligns the seals and the diaphragm. The second piece may be configured with a protruding boss which is inserted in the internal cavity of the first piece and acts to compress the two elastomeric seals and the diaphragm together so as to provide a pressure tight seal. The protruding boss also allows for proper alignment of the two pieces during assembly and the two pieces of the housing may be configured with an attachment feature which allows them to snap together upon assembly.

The method of the present invention basically comprises fabricating a semiconductor diaphragm having a piezoresistive stress sensitive device formed on its central portion and a peripheral portion to which electrically conductive regions are extended, and forming a two piece housing having at least one pressure port. The two piece housing is configured with the first piece having an internal cavity in which the diaphragm and the two elastomeric seals are positioned and a second piece which will enclose the cavity. According to the method, the premolded elastomeric seals are positioned in the internal cavity on opposite sides of the diaphragm. One elastomeric seal which is electrically conductive is positioned between the diaphragm and the electrical leads so that its conductive area is contacting the conductive regions on the periphery of the diaphragm as well as the electrical leads. The two pieces of the housing are secured together so as to exert pressure on the two seals and create a pressure tight seal across the diaphragm.

BRIEF DESCRIPTION OF THE DRAWINGS

FIGS 3A and 3B are plan and side views, respectively, of the first elastomeric seal and in particular its conductive areas.

FIGS. 4A, 4B and 4C show a plan view, cross sectional view, respectively, and a bottom view of the semiconductor diaphragm showing in particular the conductive regions on the upper surface.

DESCRIPTION OF THE PREFERRED EMBODIMENT

Figure 1:
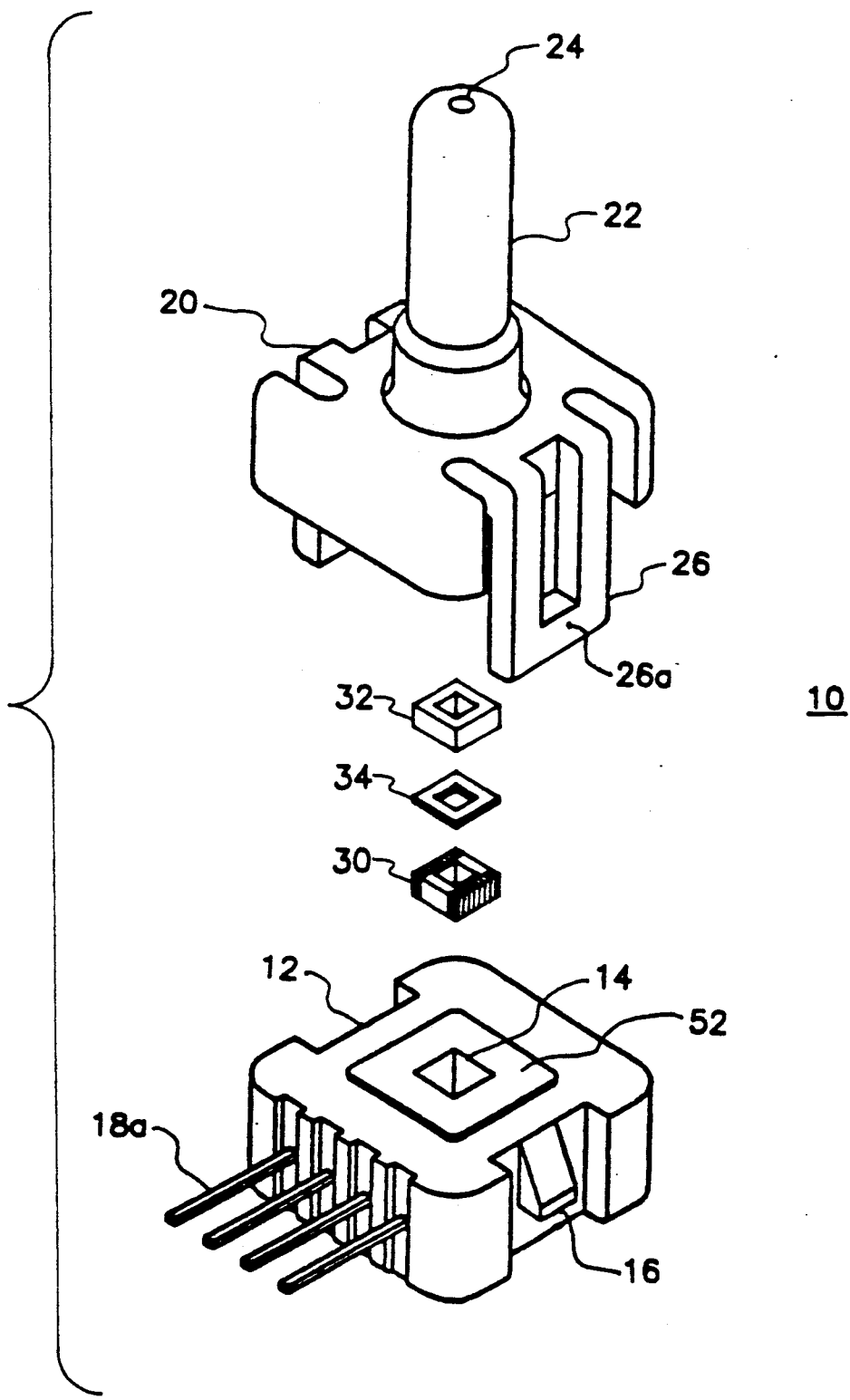
FIG. 1 is an exploded view of a piezoresistive pressure transducer in accordance with the present invention.
Figure 2:
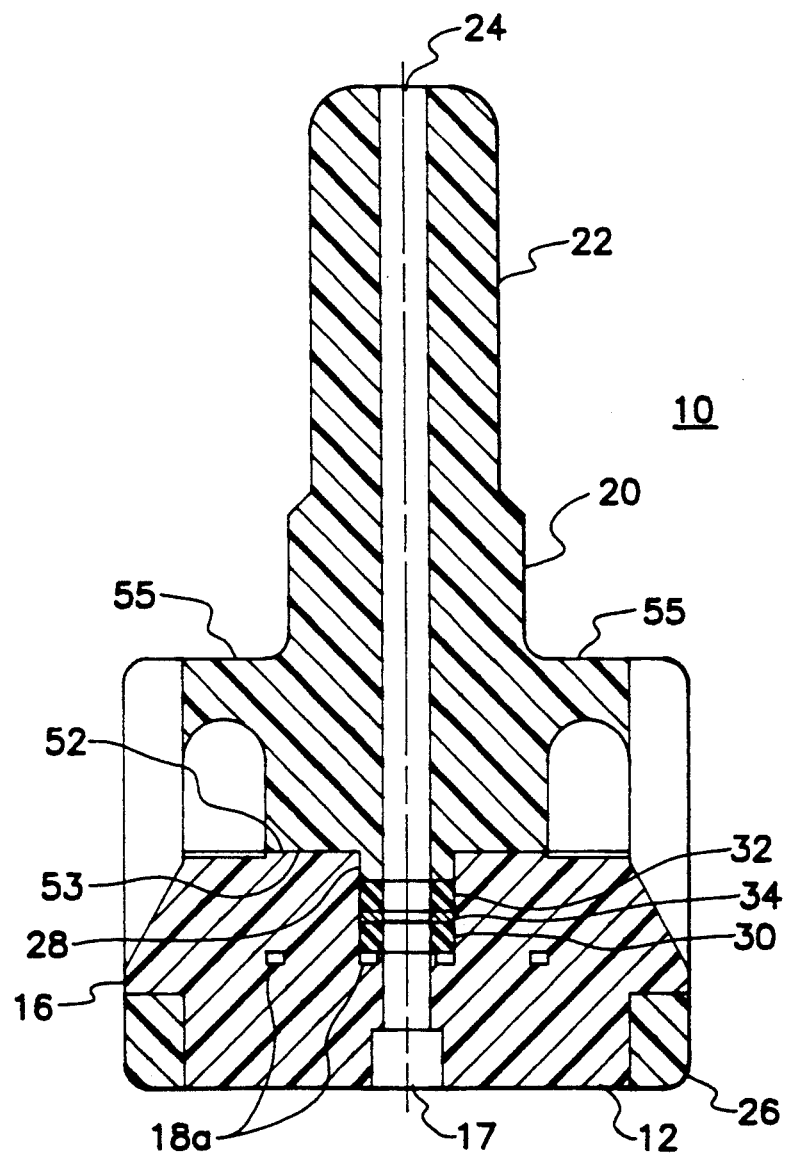
FIG. 2 is a cross sectional view of the transducer of FIG. 1.

In FIGS. 1 and 2, reference number 10 generally identifies a piezoresistive pressure transducer in accordance with the applicant's invention for sensing gauge pressure of fluid. As shown in FIGS. 1 and 2, transducer 10 includes a housing comprising a first piece 12 and a second piece 20. The first piece 12 is configured with a cavity 14 which extends part way through the fist point 12. A pressure port 17, which is smaller in cross sectional area than the cavity 14, starts at an exterior surface of the first piece 12 and runs into the cavity 14. Electrical leads are also included in the first piece 12.

The outer and inner ends of the leads can be identified by the reference numerals 18a and 18b, respectively. The leads pass from the exterior of first piece 12 into the cavity 14. Reference number 16 identifies lugs located on the exterior of the first piece 12. The lugs are used in the process of snapping the first 12 and second 20 pieces together during assembly of the transducer. This snap together function will be described in greater detail hereinafter.

The second piece 20 is configured as a molded body with a pressure port 24 which passes from end to end. A tubing connector 22 is formed to fit snugly into a section of tubing which carries a pressure to be measured. In alternative configurations of the transducer, a tubing connector 22 can be formed on just the first piece 12 and not the second, 20 or on both the first and second pieces. The protruding boss 28 is sized so as to fit into the cavity 14 of the first piece 12. The bails 26 are used in snapping the first and second pieces together. This snap together function will be described in more detail hereinafter.

The surface surrounding the first pressure port 17 in the cavity 14 is configured as a seat for an elastomeric seal. The first elastomeric seal 30 is configured to fit within the cavity 14 and to be positioned upon this seat. The surface surrounding the second pressure port 24 on the protruding boss 28 is also configured as a seat for an elastomeric seal. The second elastomeric seal 32 is configured to fit within the cavity 14 and is positioned on this seat. Each elastomeric seal is formed with opposing sides which allow it to be compressed between two parts of the transducer 10 and provide a pressure tight seal.

The first elastomeric seal 30 is adapted to selectively conduct current between its opposing sides. As seen in FIGS. 3A-3B, the area identified by the numeral 31 on the first elastomeric seal 30 is configured so that it selectively conducts current. The conductive area 31 represents repeating layers of silicone rubber and silver impregnated silicone rubber. Because the nonconductive layers of silicone rubber act as an insulator for the silver impregnated silicone rubber stripes, current is only conducted between the opposing sides of the first elastomeric seal 30. The alternating the silicone rubber layers and the silver impregnated layers is known as the Standard Silver Stax, and this material is manufactured by Elastomeric Technology, Inc.

As seen in FIGS. 4A, 4B and 4C. Reference numeral 34 identifies a square chip of semiconductor material, such as silicon, having a square area of reduced thickness therein to form a central diaphragm 42. Surrounding this diaphragm is a thickened area identified by the numeral 40. The chip 34 is doped to provide an arrangement of piezoresistors and other conductive regions therein The piezoresistors form a stress sensitive element which is sensitive to radial and lateral strain. The piezoresistors are configured into a wheatstone bridge configuration. The shaded regions in FIG. 4A represent the doped pattern in the upper surface of chip 34. Communication with the external circuitry is provided by the electrically conductive regions which are brought to the surface at locations indicated by reference numerals 38 The conductive regions 38 contact the conductive area 31 of the first elastomeric seal upon assembly of the transducer 10

Figures 5A, 5B:
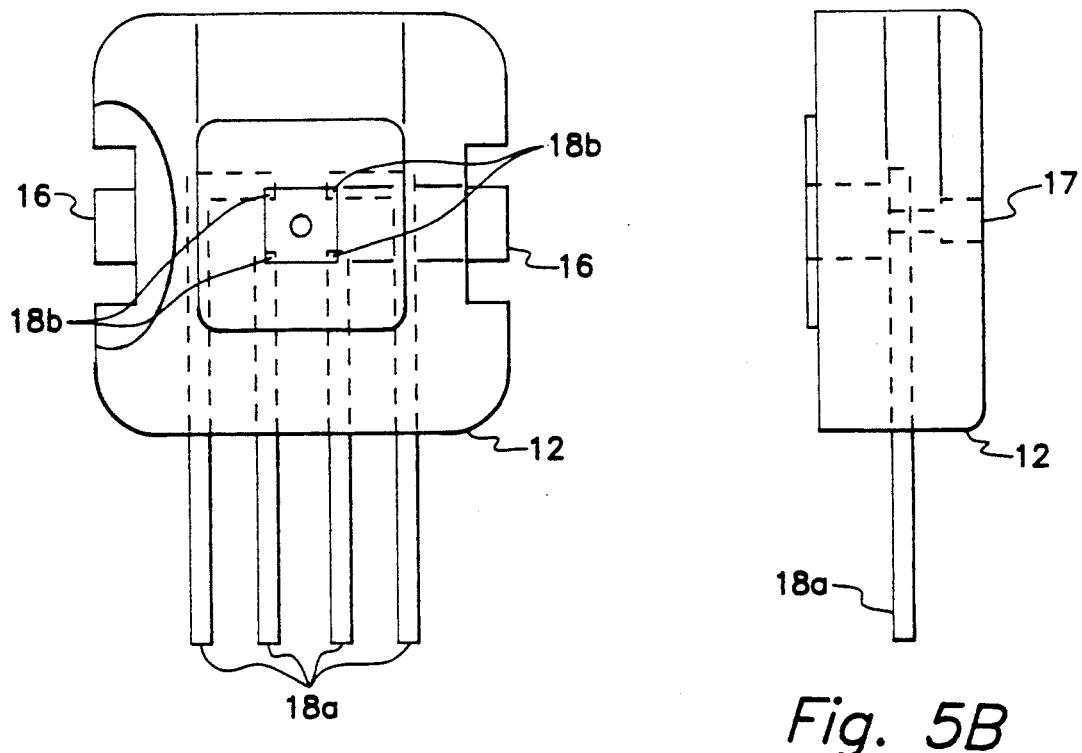
FIGS. 5A and 5B are a plan view of the first piece 12 of the transducer showing in particular the path of the electrical leads.

As shown in FIGS. 5A and 5B the electrical leads 18a, 18b run from outside the first piece 12 into the cavity 14. The first piece is molded around the electrical leads. The leads 18b, terminate at the corners of the cavity 14 on the surface previously identified as the seat for the first elastomeric seal 30. The electrical leads 18a contact the external measuring equipment.

In the assembly process, the first elastomeric seal 30 is placed in the cavity 14 with its conductive regions 38 contacting the electrical leads 18b. The chip 34 is then placed in the cavity so that conductive regions 38 contact the conductive areas 31 of the first elastomeric seal 30. Next, the second elastomeric seal 32 is positioned in the cavity 14 so that one of the opposing sides of the second elastomeric seal contacts the side of the chip 34 opposite from the first seal 30. Finally, the protruding boss 28 of the second piece is inserted in the cavity of the first piece 12 and it contacts the second seal 32. This boss aligns the first piece 12 and the second piece 20 upon assembly. The first and second pieces are then attached together, and the compressive stresses that the boss 28 puts on the two seals and the chip create a pressure tight seal across the diaphragm 42.

Upon assembly of the transducer 10 the first and second pieces will snap together The bails 26 will slide over the lugs 16 and snap securely into place This snap together function attaches the first and second pieces together and causes the protruding boss 28 to exert sufficient pressure on the two elastomeric seals and the chip to create a pressure tight seal in the cavity 14. This snap together function also allows for easy assembly and disassembly of the transducer 10.

In order to achieve an electrical output signal which accurately represents the pressure supplied to transducer lo, it is important that the prestress applied to chip 34 by seals 30 and 32 remain constant. Further, in order to achieve consistent performance of transducers as manufactured, it is important the same prestress be provided from transducer unit to transducer unit. Housing pieces 12 and 20 include several features described hereinafter which provide for nonvarying and consistent prestress on the transducer chips.

The level of prestress is determined by the distance between seats 50 and 51 in the assembled housing, and the thicknesses of seals 30 and 32 and diaphragm 34. The dimensions of the seals and diaphragm are small and easily held to close tolerances. As designed, the dimensions of cavity 14 and boss 28 are also small and easily held to close tolerances. The distance between the seats is determined by stop surfaces 52 and 53 on housing pieces 12 and 20 respectively. These stop surfaces are also designed to be relatively as shown in FIG. 2 small to facilitate holding close tolerances. Thus, the principal remaining requirement is that the two housing pieces be held so that stop surfaces 52 and 53 are in firm contact and not movable relative to one another after assembly. This function is provided by the lug and bail arrangement as follows.

Bails 26 are connected to the remainder of housing piece 20 through horizontal portions of the housing piece which have relatively small cross sections, as identified at reference numerals 55. This provides for limited resilience and biases the bight sections 26a of the bails upward against the horizontal faces of lugs 16 after assembly of the housing pieces. During assembly, housing piece 20 is pressed onto housing piece 12 by exerting downward force on the bails outward from housing cross sections 55. This causes a slight bending of the cross sections as the housing pieces are pressed together and bight sections 26a of the bails snap over lugs 16. When the assembly pressure is released, the resilience of cross sections 55 maintain stop surfaces 52 and 53 on the housing pieces in tight contact.

Figure 6:
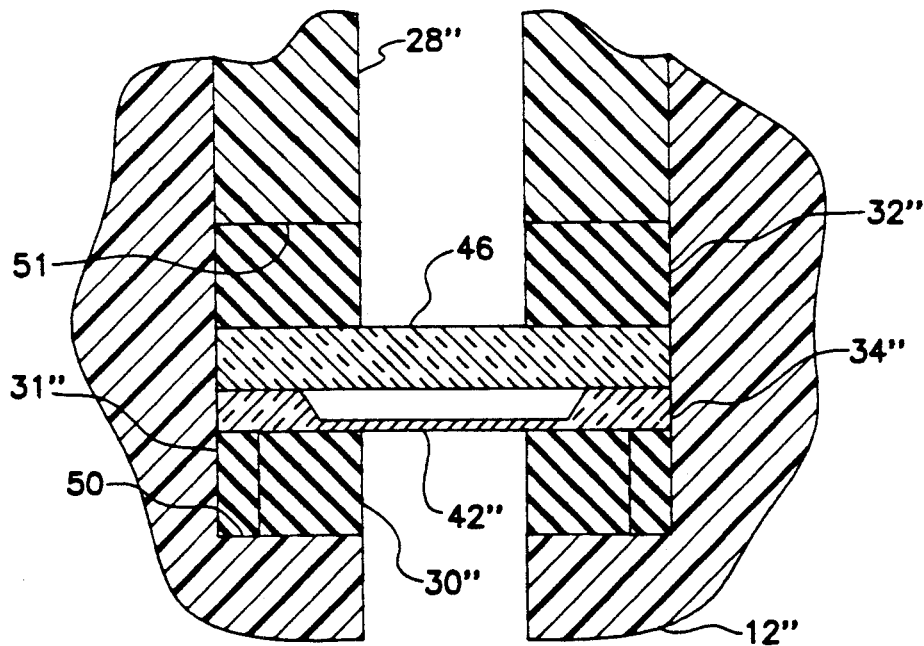
FIG. 6 is a fragmentary perspective view of another form of the transducer.

FIG. 6 illustrates the modifications necessary for use in absolute pressure sensing applications. In FIG. 6 the parts common to the embodiment of FIGS. 1 and 2 are identified by the same reference numerals with the addition of double prime notations The embodiments of FIG. 6 differs from the embodiment of FIGS. 1 and 2 primarily in that a silicon or glass cover plate 46 is bonded to the side of chip 34,, opposite diaphragm 42,, while the space within the rim of the chip is evacuated so as to provide a vacuum reference. The only remaining difference involves minor alterations of parts, dimensions and/or spacing to accommodate the thickness of plate 46.

In accordance with the foregoing description, the applicant has provided a unique, low cost, highly versatile piezoresistive pressure transducer design. Two specific embodiments have been shown and described for illustrative purposes However, a number of variations and modifications within the applicant's contemplation and teaching will be apparent to those of ordinary skill in the relevant arts. It is not intended that coverage be limited to the discloses embodiment but only by the terms of the following claims.

The embodiments of the invention in which an exclusive property or right is claimed are defined as follows:

1. A pressure transducer assembly comprising:
   a diaphragm of semiconductor material having a central portion with a stress sensitive device formed thereon electrically conductive regions extending from the stress sensitive device to a peripheral portion of said diaphragm;
   a housing containing said diaphragm and having at least one pressure port which communicates with said diaphragm, and said housing and having first and second opposing internal surfaces configured to form first and second seats for seals on opposite sides of the diaphragm;
   electrical leads which extend from one of the interior to the exterior of the housing are positioned proximate to the first seats; and
   first and second elastomeric seals located between said diaphragm and the first and second seats respectively, each of said elastomeric seals being molded in a configuration to extend from the seat on a separate one of the internal surfaces of said housing to a surface of said diaphragm at a location surrounding the central portion thereof, said housing being adapted to hold said first and second seals and said diaphragm between the first and second seats so as to form a pressure tight seal between said housing and said diaphragm on opposite sides thereof, said first elastomeric seal being electrically conductive so as to conduct current from the electrically conductive regions on said diaphragm to the electrical leads.

2. The transducer assembly of claim 1 wherein:
   the housing comprises first and second pieces;
   the first piece is formed with a cavity;
   the second piece is formed with an internal boss which can be inserted into the cavity of the first piece; and
   the diaphragm is positioned in the cavity of the first piece between the first and second seal.

3. The transducer assembly of claim 2 wherein the first piece and the second piece are adapted to snap together upon assembly.

4. The transducer of claim 3 wherein the first and second pieces are formed with cooperating bails and lugs which allow the said pieces to snap together.

5. The transducer assembly of claim 4 wherein the internal boss of the second piece is of a predetermined length so as to induce a prestress on the first and second elastomeric seals and the diaphragm to create a pressure tight seal.

6. The transducer assembly of claim 5 wherein: said first piece is provided with a pressure port therein adapted to be supplied with a pressure to be sensed; and
   a first chamber is configured in the cavity of the first piece, wherein said chamber communicates with the pressure port in said housing piece and is bounded by the central portion of said diaphragm, said first elastomeric seal, and said first piece.

7. The transducer assembly of claim 6 wherein:
   said diaphragm is configured with a peripheral rim which partially surrounds a space, and an open end which extends toward said second piece;
   a glass plate is fitted over the opening to enclose the space; and
   the space within the rim is evacuated, and the rim is sealed with the glass plate so as to provide an absolute pressure sensor.

8. The transducer assembly of claim 6 wherein said second piece has a pressure port therein, the pressure port of the second piece communicating with a second chamber bounded by the central portion of said diaphragm, said second elastomeric seal and said second piece, whereby the transducer assembly is adapted to sense a pressure differential between the pressure ports in said first and second pieces.

9. A pressure transducer assembly comprising:
   a two piece housing in which a first housing piece is configured with a cavity, a second housing piece is configured with an opposing surface which closes the cavity when the first and second piece are assembled as said housing, said housing having at least one pressure port therein which communicates with the cavity;
   electrical leads adapted to conduct current from the interior of the first housing piece to the exterior of the housing;
   a first elastomeric seal with first and second opposing sides between which said seal is adapted to conduct electrical current, said first elastomeric seal being located in the cavity with the first opposing side in a sealed relationship with said housing surrounding the pressure port, said first opposing side being in electrical contact with the electrical leads;
   a diaphragm of semiconductor material with first and second opposing sides having a central portion with a stress sensitive device formed thereon and electrically conductive regions formed on the first side extending from the stress sensitive device to a peripheral portion of said diaphragm being positioned in the cavity of the first housing piece so that the first side contacts the second opposing side of the first seal; and
   a second elastomeric seal with first and second opposing sides is positioned in the cavity so that the first opposing side thereof contacts the second side thereof is in a sealed relationship the second housing piece;

10. The transducer of claim 9 wherein said second housing piece is configured with a protruding boss configured to be inserted into the cavity of the first piece upon assembly.

11. The transducer of claim 10 wherein the first and second housing pieces are adapted to snap together upon assembly.

12. The transducer of claim 11 wherein the first and second housing pieces are formed with cooperating bails and lugs which allow the said pieces to snap together.

13. The transducer assembly of claim 12 wherein the internal boss of the second housing piece is of a predetermined length so as to induce a prestress on the first and second elastomeric seals and the diaphragm to create a pressure tight seal.

14. The transducer assembly of claim 13 wherein:
   said first housing piece is provided with a pressure port therein adapted to be supplied with a pressure to be sensed; and
   a first chamber is configured in the cavity of the first housing piece wherein said chamber communicates with the pressure port in said first housing piece and is bounded by the central portion of said diaphragm, said first elastomeric seal, and said first housing piece.

15. The transducer assembly of claim 14 wherein:
   said diaphragm is configured with a peripheral rim which partially surrounds a space, and an open end which extends toward said second housing piece;
   a glass plate is fitted over the opening to enclose the space; and
   the space within the rim is partially evacuated, and the rim is sealed with plate so as to provide an absolute pressure sensor.

16. The transducer assembly of claim 13 wherein said second housing piece has a pressure port therein, the pressure port of the second housing piece communicating with a second chamber bounded by the central portion of said diaphragm, said second elastomeric seal and said second housing piece, whereby the transducer assembly is adapted to sense a pressure differential between the pressure ports in said first and second housing pieces.

17. A method of producing a pressure transducer assembly comprising the steps of:
   providing a first housing piece in which a cavity is formed and electrical leads are provided to conduct current from a wall of the cavity to the exterior of said housing piece;
   positioning a first elastomeric seal in contact with the electrical leads within the cavity of the first housing piece, said first elastomeric seal having opposing sides and being adapted to conduct current between said opposing sides;
   positioning a stress sensitive device within the cavity adjacent to the first elastomeric seal wherein said stress sensitive device having first and second opposing sides, a central diaphragm portion whereupon a stress sensitive element is formed, and electrically conductive regions formed on the first side which extend from the stress sensitive element to a peripheral portion of said device, so that said conductive regions contact one opposing side of the first elastomeric seal;
   positioning a second elastomeric seal within the cavity adjacent to the stress sensitive device, said second elastomeric seal having opposing sides of which one side contacts the second side of the stress sensitive device;
   providing a second housing piece which is configured with a surface which will close the cavity and contact the side of the second elastomeric seal opposite said stress sensitive device; and
   securing the first and second pieces together so that a pressure tight seal is created in the cavity between the first and second elastomeric seals and the stress sensitive device.

18. The method of claim 17 wherein the two pieces of the housing are configured so as to snap together upon assembly.

19. The method of claim 18 wherein the two pieces of the housing are configured with cooperating lugs and bails so as to snap together upon assembly.

20. The method of claim 19 wherein:
   the second piece is configured with an internal boss; and
   the internal boss of the second piece is configured so as to be inserted into the cavity of the first piece and compress the first and second elastomeric seals against the diaphragm to provide a pressure tight seal.

21. A pressure transducer, comprising:
   a pressured sensitive device having a stress sensitive region and an electrically conductive region;
   a housing shaped to receive said pressure sensitive device; and
   a first elastomeric seal disposed between a first side of said pressure sensitive device and a first seat formed on a surface of said housing, said first elastomeric seal having an opening formed therein and a selectively conductive region, said selectively conductive region comprising a plurality of conductive layers alternatively arranged with insulative layers, said selectively conductive region being disposes in electrical communication with said electrically conductive region of said pressure sensitive device, said opening being disposed in fluid communication with said stress sensitive region of said pressure sensitive device.

22. The pressure transducer of claim 21, further comprising:
   a second elastomeric seal disposed between a second side of said pressure sensitive device and a second seat formed within said housing.

23. The pressure transducer of claim 21, further comprising:
   a fluid channel formed in said housing extending from said opening to an external portion of said housing.

24. The pressure transducer of claim 21, further comprising:
   a generally rigid plate disposes on a second side of said pressure sensitive device forming a sealed chamber between said generally rigid plate and said second side of said pressure sensitive device.

25. The pressure transducer of claim 21, further comprising:
   an electrical lead extending through a portion of said housing, said lead being disposed in electrical communication with said selectively conductive region of said first elastomeric seal.

* * * * *